United States Patent [19]

Piret

[11] Patent Number: 4,659,752

[45] Date of Patent: Apr. 21, 1987

[54] GLASS FIBER REINFORCED THERMOPLASTICS

[75] Inventor: Willy H. Piret, Jalhay, Belgium

[73] Assignee: Owens-Corning Fiberglas Coporation, Toledo, Ohio

[21] Appl. No.: 811,211

[22] Filed: Dec. 20, 1985

[51] Int. Cl.$^4$ .............................................. C08K 3/40
[52] U.S. Cl. ................................... 523/206; 523/209
[58] Field of Search .............................. 523/206, 209

[56] References Cited

U.S. PATENT DOCUMENTS

| | | | |
|---|---|---|---|
| 3,936,415 | 2/1976 | Coakley | 523/209 |
| 4,174,358 | 11/1979 | Epstein | 525/184 |
| 4,289,672 | 9/1981 | Friederich et al. | 523/209 |
| 4,425,384 | 1/1984 | Brownscombe | 523/209 |

FOREIGN PATENT DOCUMENTS

| | | | |
|---|---|---|---|
| 53-20533 | 6/1978 | Japan | 523/209 |
| 57-21426 | 2/1982 | Japan | 523/209 |

*Primary Examiner*—Lewis T. Jacobs
*Attorney, Agent, or Firm*—Ronald C. Hudgens; Patrick P. Pacella

[57] ABSTRACT

Specific thermoplastic rubber coatings on a glass strand yield improved Gardner impact strength in a reinforced matrix. The coated strands pure or mixed with other glass fibers produce especially tough reinforced thermoplastics.

13 Claims, 2 Drawing Figures

GLASS FIBER REINFORCED THERMOPLASTICS

TECHNICAL FIELD

This invention relates to glass fiber reinforced thermoplastics wherein a portion of the fibers are coated with thermoplastic rubber.

BACKGROUND ART

Up to now, the prior art has focused mainly on rubber modifications for non-reinforced thermoplastics. The use of rubber modification with glass reinforced thermoplastics is only described as an extension to the non-reinforced use. In general, they describe the impact strength to increase regularly with the rubber addition up to 40% in weight of the total matrix. All other properties decrease with rubber addition, e.g., tensile strength and flexural strength. In that way, to achieve the best impact one has to use the maximum rubber content allowed by the minimum strength requested by the application. In general, such rubber modifications are ranging around 20 to 40% in weight of the total matrix.

DISCLOSURE OF THE INVENTION

We have found that with glass fibers, the rubber toughening mechanism is different and is not a simple extension of the unreinforced one. We have found that impact strength does not increase continuously with rubber content and that there are two antagonist effects that give an optimum rubber modification. We have found that impact strength decreases opposite to non-reinforced rubber modified thermoplastics.

We have also found that about 4% (in the optimum cases) of the rubber addition is not significantly detrimental to the other mechanical properties such as tensile strength and flexural strength. The prior art does not describe the use of that optimum quantity of specific rubber as a coating on the glass fiber.

The art describes developments focusing on notched Izod impact which is not of great sensitivity in glass reinforced thermoplastic studies, particularly because most of the fibers are aligned during the injection molding of the test specimen perpendicular to the impact pendulum.

We have run our studies mainly with the Gardner impact type (falling dart or falling ball type). In this test, the impact is multiaxial and not related to the fiber alignment during the injection molding of the test specimen.

We have also discovered that the impact properties enhancement due to the thermoplastic rubber modification is a function of the fiber length achieved in the final test specimen. This is of particular interest for applications in the new development area of long fiber reinforced thermoplastics.

This is also of great importance in the development of super tough grades of glass reinforced thermoplastics.

BEST MODE OF CARRYING OUT INVENTION

Figure 1:
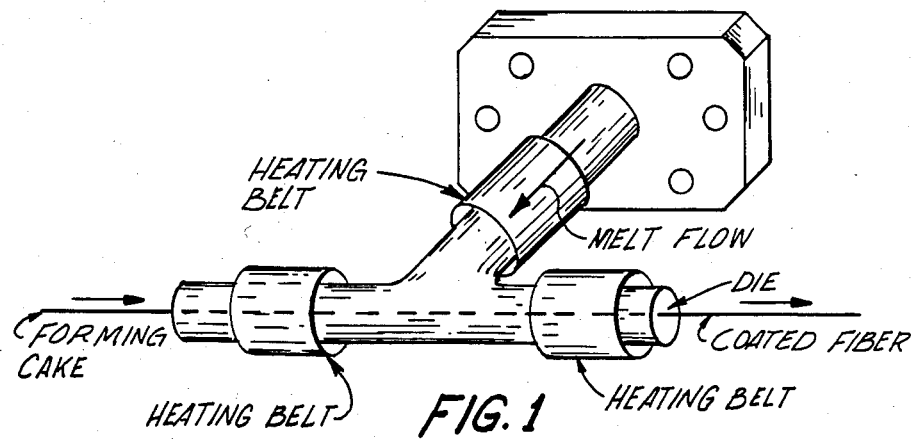
FIG. 1 illustrates the coating head one may employ to coat fibers according to this invention.
Figure 2:
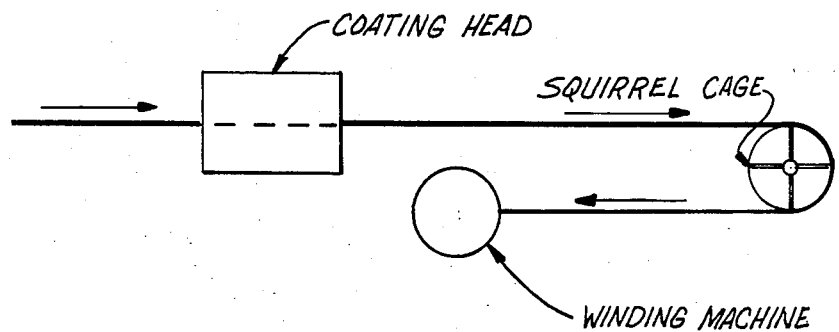
FIG. 2 is a flow diagram showing the coating head, squirrel cage and winding machine.

The invention consists of coating a glass strand with a specific thermoplastic rubber coating and using this coated glass fiber, pure or mixed, with other glass fibers as a reinforcement for thermoplastics.

The coating can be applied directly under the bushing or off line. Actual preferred embodiment is off-line. The glass can be un-sized or sized; glass, roving or chopped strand. Up to now, the preferred method has been using a continuous sized glass bundle with a conventional aqueous size. The coating can be applied by any known method, i.e., though dispersion in water or in another liquid, solution, hot melt coating or spraying, electrostatic powder coating. The preferred embodiment is hot melt coating.

A thermoplastic rubber with regard to this invention should be understood as a thermoplastic having a tensile modulus being at least ten times smaller than the modulus of the matrix in which it has to be used. See U.S. Pat. No. 4,174,358. Examples include:

Polyetherester known as thermoplastic polyester rubber—commercial examples are: Hytrel ® or Arnitel ®.

Polyetherblockamide known as thermoplastic polyamide rubber—commercial examples are: Pebax ®.

Acrylonitrile-butadiene rubber—commercial examples are: Perbunan N ®.

Acrylic rubber—commercial examples are: Paraloid ®.

Zinc or sodium salt of olefin ionomere resins—commercial examples are: Surlyn ®.

Styrene butadiene copolymer or terpolymer—commercial examples are: Solprene ® or Cariflex ®.

Ethylene propylene copolymer or terpolymer—commercial example: Dutral ®.

A blend of these ethylene propylene copolymers with other olefin polymers—commercial example: Vistaflex ®.

Any of the above-mentioned polymer may be grafted with maleic anhydride or acid, acrylic acid or unsaturated silane or maleic anhydride and unsaturated silane simultaneously.

** By unsaturated silane, it should be understood any silane having at least one reactive unsaturated double bond, example are:
vinyltrichlorosilane
vinyltriethoxysilane
vinyltrimethoxysilane
vinly-tris-(beta-methoxyethoxy) silane
vinyltriacetoxysilane
gamma-methacryloxypropyl-trimethoxysilane
gama-methacryloxypropyl-tris(beta-methoxyethoxy) silane
vinyldimethylchlorosilane
vinyldimethyldichlorosilane
vinyltriacetoxysilane
3[2 (vinyl benzylamino) ethylarmino]propyltri methoxysilane The preferred embodiments are a polyetherester, polyetheramide or 40 to 60% blend of a block ethylene propylene copolymer with polyethylene or vinyl silane and/or maleic anhydride grafted blend of polyethylene with a block copolymer of ethylene propylene.

The invention applies to reinforcement of any type of thermoplastic matrixes such as polyamides (PA6, PA66, PA12, PA11, polyarylamide), polypropylene (PP), coupled PP, polyethylene (PE), polybutylene terephthalate (PBT), polycarbonate (PC), polyethylene terephthalate (PET), polyphenylene sulfide (PPS), polystyrene (PS), polyphenylene ether (PPE or PPO), polymers and copolymers of styrene, polyvinyl chloride, polysulfone and others.

The preferred matrix is PA6 or PA66.

The other products in use in this invention are:

PX001: is a 50% blend of Riblene ® B21 polyethylene with a block copolymer of ethylene and propylene. Commercially available from Polytech S.A.

PE: is a polyethylene and refers to Riblene ® B21 from Anic.

EP: refers to the block copolymer ethylene propylene used into PX001 blend.

Vistaflex ® VMX82-1: (from Esso) is a ±50% blend of a polyolefin with a block copolymer of ethylene (55%) and propylene (45%).

Hytrel ® 5556: (from DuPont) is a polyetherester.

Arnitel ® EM550: (from AKZO) is a polyetherester.

Pebax ® 5533: (from ATO Chem) is polyetherblockamide

Perbunan ® N3810: (from Bayer) is an acrylonitrile butadiene rubber.

Paraloid ® KM 653: (from R&H) is an acrylic toughening agent.

Surlyn ® 8920: (from DuPont) is a zinc salt of ethylene/acid methacrylic copolymer.

Santoprene ® 203-50: (from Monsanto) is a thermoplastic rubber.

It should be well understood that this invention describes a thermoplastic coating to be applied on glass fibers in a quantity being equivalent to that needed to achieve between 2 and 6% in weight modification of the matrix in which the glass will be used.

The glass fibers, or only a part of the glass fibers, can be coated to between 5 and 50% by weight of the glass with the thermoplastic. For example:

Trial B4 in Table 1 is made by compounding together:

1717 gr of PA66

181 gr of chopped strands coated with 38% in weight EP.

1190 gr of R23DX1 chopped strand glass fiber from Owens-Corning Fiberglas.

This achieves a 3.9% EP modification of the matrix for a 40% weight glass reinforcement.

The same results could have been achieved by using 1300 gr of chopped strands coated with 5% in weight of EP.

It is also evident that with lower glass percentage in the formulation, we would be obliged to use glass coated with more rubber to achieve the same final matrix modification.

The preferred range of application of this invention is 20 to 50% in weight glass reinforcement of the matrix and a thermoplastic coating ranging between 4 and 40% in weight on the glass.

Table 1 illustrates that thermoplastic rubber toughening can be achieved as well by coating a glass roving or chopped strand with the thermoplastic than by putting it directly into the matrix as an additive (conventional toughening).

Trials B4 and B5, done with glass coated with an ethylene propylene rubber (EP), achieve respectively 39 and 60% increase of the Gardner impact strength. In this case, only a small fraction of the glass used was coated with EP rubber.

Similar gains on Gardner impact are achieved when adding the EP to the matrix; trials B7 and B8 achieve respectively 95 and 54% gain.

The same is observed with PX001 impregnated roving versus simple addition of the PX into the matrix (B11 and B12).

These trials prove that we have achieved efficient toughening using a glass fiber coated with a thermoplastic such as EP or PX001.

Coatings from 0 to 40% on the strand were experimented.

TABLE 1

| | 40% GLASS REINFORCED PA66 | | | | | | | | |
|---|---|---|---|---|---|---|---|---|---|
| Trials | % coated on glass | % added into PA | Fiber length (mm) | E(kJ/m$^2$) Charpy | Δ % vs. ref. | E(kJ/m$^2$) Izod | Δ % vs. ref. | h (cm) Gardner | Δ % vs. ref. |
| B2 | 0 CS | 0 | 0.225 | 60 | — | 69 | — | 32 | — |
| B3 | 0 CS | 4 | 0.217 | 75 | 29 | 72 | 6 | 42 | 39 |
| B4 | 3.9 CS/EP | 0 | 0.136 | 78 | 30 | 73 | 7 | 43 | 39 |
| B5 | 2.4 CS/EP | 0 | 0.158 | 69 | 17 | 74 | 8 | 50 | 60 |
| B6 | 0 CS | 0 | 0.165 | 71 | 20 | 70 | 3 | 31 | 2 |
| B7 | 0 CS | 4/EP | 0.164 | 78 | 34 | 69 | 2 | 59 | 95 |
| B8 | 0 CS | 4/EP | 0.214 | 76 | 30 | 73 | 7 | 46 | 54 |
| B9 | 0 CS | 0 | 0.201 | 57 | — | 67 | — | 28 | — |
| B10 | 0 roving | 0 | 0.216 | 59 | — | 67 | — | 26 | — |
| B11 | 0 roving | 1/PX001 | | 67 | 14 | 69 | 3 | 30 | 14 |
| B12 | 1 roving/ PX001 | 0 | 0.199 | 71 | 20 | 73 | 9 | 29 | 10 |
| B13 | 0 roving/ PX001 | 2.2/PX001 | | 66 | 12 | 72 | 7 | 32 | 21 |
| B14 | 0 roving | 0 | | 76 | — | 78 | — | 30 | — |
| B15 | 0 roving | 10.9/PX001 | | 71 | −6 | 63 | 19 | 35 | 15 |
| B16 | 10.9 roving/ PX001 | 0 | | 66 | −13 | 66 | −15 | 49 | 61 |

| Trials | % coated on glass | % added into PA | Fiber length (mm) | Tensile str(MPa) | Δ % vs. ref. | Elongation % | Δ % vs. ref. | Tens. mod E (Mpa) | Δ % vs. ref. |
|---|---|---|---|---|---|---|---|---|---|
| B2 | 0 CS | 0 | 0.225 | 198 | — | 3 | — | 11639 | — |
| B3 | 0 CS | 4 | 0.217 | 210 | 2 | 3 | 24 | 13329 | 12 |
| B4 | 3.9 CS/EP | 0 | 0.136 | 234 | 10 | 3 | 10 | 13793 | 9 |
| B5 | 2.4 CS/EP | 0 | 0.158 | 232 | 9 | 3 | 6 | 14404 | 5 |
| B6 | 0 CS | 0 | 0.165 | 236 | 11 | 3 | 6 | 18699 | 24 |
| B7 | 0 CS | 4/EP | 0.164 | 212 | 1 | 3 | 11 | 13502 | 11 |
| B8 | 0 CS | 4/EP | 0.214 | 216 | +1 | 3 | 15 | 11905 | −21 |

TABLE 1-continued

| | | 40% GLASS REINFORCED PA66 | | | | | | | |
|---|---|---|---|---|---|---|---|---|---|
| B9 | 0 CS | 0 | 0.201 | 229 | — | 3 | 7 | 18606 | — |
| B10 | 0 roving | 0 | 0.216 | 230 | — | 3 | — | 13425 | — |
| B11 | 0 roving | 1/PX001 | | 233 | +1 | 3 | 5 | 13487 | −11 |
| B12 | 1 roving/ PX001 | 0 | 0.199 | 232 | 1 | 3 | 0 | 14909 | −1 |
| B13 | 0 roving/ PX001 | 2.2/PX001 | | 228 | −1 | 3 | 3 | 13769 | 9 |
| B14 | 0 roving | 0 | | 214 | — | 3 | — | 11943 | — |
| B15 | 0 roving | 10.9/PX001 | | 220 | +3 | 3 | −7 | 13868 | +16 |
| B16 | 10.9 roving/ | 0 | | 176 | −18 | 3 | 14 | 9754 | −22 |

Table 2 shows that when adding EP, PE or PX to PA66 matrix reinforced with 40% R23D coated glass fibers, there is a maximum improvement with 4% in weight additive of the matrix.

Up to that percentage, tensile strength and Young modulus are not significantly altered. For percentages over 4%, all properties, including impact, decrease.

It appears also that the mixing of PE with EP leads to a synergetic effect on the toughening.

This demonstrates a particular toughening mechanism with glass reinforced PA modified with olefins, very much different from the one experienced commonly with the non-reinforced PA.

TABLE 2

40% GLASS REINFORCED PA66
Effect on the mechanical properties of the addition of toughening agent to the matrix.

| Trial | Additive | % of the matrix | Izod impact unnotched kJ/m² | Gain Δ % | Charpy Impact kJ/m² | Gain Δ % | Gardner Impact h = E/mg (cm) | Gain Δ % | Tensile strength (MPa) | Gain Δ % | E Young modulus | Gain Δ % | Elongation Δ % | Gain Δ % |
|---|---|---|---|---|---|---|---|---|---|---|---|---|---|---|
| A1 | 0 | 0 | 62 | — | 67 | — | 40 | — | 136 | — | 8192 | — | 3 | — |
| A2 | PX001 | 2 | 79 | 39 | 66 | 10 | 45 | 35 | 136 | 5 | 8280 | 14 | 3 | −14 |
| A3 | PX001 | 4 | 81 | 43 | 75 | 26 | 51 | 53 | 144 | 11 | 8262 | 14 | 3 | 4 |
| A4 | PX001 | 6 | 76 | 39 | 70 | 17 | 42 | 29 | 132 | 2 | 7573 | 4 | 3 | 4 |
| A5 | 0 | 0 | 58 | — | 54 | — | 29 | — | 132 | — | 7392 | — | 3 | — |
| A6 | 0 | 0 | 61 | — | 61 | — | 35 | — | 135 | — | 7706 | — | 3 | — |
| A7 | PE | 2 | 59 | 4 | 61 | 2 | 39 | 17 | 127 | −2 | 5915 | −19 | 3 | 19 |
| A8 | PE | 4 | 61 | 7 | 66 | 11 | 39 | 18 | 124 | −4 | 6282 | −14 | 3 | 13 |
| A9 | PE | 6 | 62 | 9 | 68 | 14 | 37 | 11 | 121 | −7 | 6646 | −9 | 3 | 7 |
| A10 | 0 | 0 | 49 | — | 55 | — | 29 | — | 124 | — | 6600 | — | 2 | — |
| A11 | 0 | 0 | 54 | — | 60 | — | 34 | — | 121 | — | 6496 | — | 3 | — |
| A12 | EP | 2 | 59 | 4 | 59 | 0 | 37 | 11 | 125 | −4 | 6384 | −12 | 3 | 11 |
| A13 | EP | 4 | 75 | 32 | 63 | 5 | 45 | 37 | 133 | 3 | 8365 | 15 | 3 | 0 |
| A14 | EP | 6 | 74 | 30 | 65 | 10 | 48 | 44 | 134 | 3 | 8005 | 10 | 3 | −4 |

Table 3 demonstrates that we have studied different thermoplastic additives in order to select the thermoplastics achieving the best toughening effect.

We have found that Vistaflex PX001, Hytrel, Arnitel, maleic anhydride grafted Vistaflex and vinyl silane grafted vistaflex achieve the most spectacular increase of the Gardner impact strength.

These results justify the fact that these coatings are an advance over prior experience.

TABLE 3

INFLUENCE OF DIFFERENT TOUGHENING ADDITIVES ON THE MECHANICAL PROPERTIES OF 40% GLASS REINFORCED PA66

| Trial | Additive % of the matrix | Type | E (kJ/m²) Charpy | Δ % | E (kJ/m²) Izod | Δ % | h (cm) Gardner | Δ % | Tensile strength (MPa) | Δ % | Young modulus (MPa) | Δ % |
|---|---|---|---|---|---|---|---|---|---|---|---|---|
| D1* | 4 | PX001 | 63 | 27 | 36 | 18 | 29 | 4 | 147 | −6 | 24794 | 75 |
| D2* | 0 | / | 52 | — | 44 | — | 28 | — | 157 | — | 21617 | — |
| D3 | 4 | PX001 | 75 | 5 | 83 | 6 | 45 | 46 | 215 | −4 | 26358 | −50 |
| D4 | 0 | / | 68 | — | 62 | — | 34 | — | 223 | — | 46919 | — |
| D5 | 4 | Vistaflex | 78 | 8 | 85 | 12 | 44 | 47 | 212 | −6 | 25703 | 55 |
| D6** | 4 | Vistg AM0 | 77 | 9 | 89 | 17 | 55 | 81 | 219 | −3 | 20984 | 26 |
| D7** | 4 | Vistg AM1 | 78 | 11 | 83 | 10 | 59 | 94 | 215 | −4 | 20733 | 25 |
| D8** | 4 | Vistg AM2 | 81 | 16 | 82 | 6 | 59 | 95 | 215 | −3 | 14680 | −11 |
| D9 | 0 | / | 71 | — | 73 | — | 29 | — | 229 | — | 17291 | — |
| D10 | 4 | Vistaflex | 80 | 8 | 78 | 12 | 46 | 47 | 212 | −6 | 18378 | 10 |
| D11** | 4 | Vistg VS0 | 82 | 18 | 91 | 21 | 49 | 59 | 222 | −1 | 20475 | 23 |
| D12** | 4 | Vistg VS2 | 83 | 19 | 85 | 13 | 51 | 70 | 217 | −3 | 16317 | −2 |
| D13 | 0 | / | 73 | — | 75 | — | 30 | — | 226 | — | 15850 | — |
| D14 | 4 | Vistaflex | 66 | 8 | 97 | 12 | 43 | 47 | 207 | −8 | 15788 | −5 |
| D15** | 4 | Vistg AA0 | 79 | 13 | 116 | 54 | 41 | 34 | 214 | −5 | 12760 | −23 |
| D16** | 4 | Vistg AA2 | 80 | 16 | 112 | 50 | 42 | 39 | 213 | −5 | 11152 | −32 |
| D17 | 0 | / | 69 | — | 86 | — | 29 | — | 225 | — | 16582 | — |
| D18 | 4 | Hytrel | 89 | 27 | 117 | 55 | 41 | 35 | 225 | 2 | 16535 | −0 |
| D19 | 4 | Perbunan | 77 | 8 | 119 | 56 | 37 | 19 | 216 | −3 | 11530 | −30 |
| D20 | 4 | PX001 | 83 | 17 | 113 | 47 | 43 | 40 | 214 | −4 | 13242 | −20 |
| D21 | 4 | Paraloid | 83 | 18 | 122 | 62 | 38 | 24 | 217 | −1 | 11637 | −29 |

TABLE 3-continued
INFLUENCE OF DIFFERENT TOUGHENING ADDITIVES ON THE MECHANICAL PROPERTIES OF 40% GLASS REINFORCED PA66

| Trial | Additive % of the matrix | Additive Type | E (kJ/m²) Charpy | Δ % | E (kJ/m²) Izod | Δ % | h (cm) Gardner | Δ % | Tensile strength (MPa) | Δ % | Young modulus (MPa) | Δ % |
|---|---|---|---|---|---|---|---|---|---|---|---|---|
| D22 | 4 | Santoprene | 58 | −20 | 81 | 4 | 30 | −4 | 198 | −12 | 15485 | −7 |
| D23 | 4 | Surlyn | 80 | 10 | 105 | 34 | 30 | −4 | 214 | −6 | 14018 | −15 |
| D24 | 4 | Arnitel | 81 | 12 | 123 | 57 | 39 | 39 | 228 | 1 | 10499 | −37 |

*Chopped strands were introduced with the polymer pellets in the first hopper of the twin screw extruder in order to achieve the shortest glass fibers in the final compound. In all the other trials, chopped strands were introduced into the polymer melt.
**For grafting process and conditions.

Table 4 demonstrates there is a relationship between the fiber length and the toughening effect. The positive effect of the same % of additive being more important with longer fibers for Gardner impact and Tensile. Within practical limits, the longer length of the fibers should be sufficient for the reinforced composite to have a desirable Gardner impact strength. Generally, this will range up to a practical chopped length, typically up to 75 mm.

This is of a particular importance as it extends the application field of this invention to the field of injection molding of long fiber impregnated thermoplastic. See U.S. Pat. Nos. 4,098,927 and 4,429,998.

TABLE 4
EFFECT OF FIBER LENGTH ON RUBBER TOUGHENING
4% PX001 modified PA66 matrix, 40% glass (4.5 mm)

| Compounding | Fiber Length (mm) | Charpy Unnotched | Izod Unnotched | Gardner | Tensile (MPa) |
|---|---|---|---|---|---|
| twin screw | 0.13 | +27% | +18% | +3.5% | 147 |
| single screw | 0.14 | +18% | +30% | +37% | 144 |
| twin screw | 0.22 | +4.5% | +5.9% | +45.7% | 215 |

INDUSTRIAL APPLICABILITY

Glass fibers used in the practice of this invention can be "E" glass fibers, well known to those skilled in the art; such fibers are described in U.S. Pat. No. 2,334,961.

Strands of glass fibers are produced by pulling several hundred or more tiny molten streams of glass which issue from holes in the bottom of a molten glass tank over a size applying apron to a gathering shoe which groups the fibers together into a strand. This strand then proceeds to a traverse mechanism and winding drum which provides the pulling action which attenuates the molten glass and coils the strand into a package (also called forming cape). The fibers are individually separated at the time that they pass over the size applicator, so that the surfaces of the fibers are substantially completely coated with a size before they are drawn together into a strand. This size acts as a lubricant which separates the individual filaments, and if the filaments are not separate by the size, they may scratch each other and break as they are flexed and drawn over guide eyes in the subsequent finishing operations.

We then coated the glass strand as described in this invention by using an extruder. We were able to do this at winding speeds up to 600 meters/minute.
Materials:
  PX001 coating
  Conventional forming cake The forming cake strand which is maintained under tension by a tensioning device passes right under the polymer rods coming out of the extruder die. This way, the polymer is conveyed to the die through the barrel which is heated by the heating belt. See FIG. 1.

The strand linear speed, the polymer temperature and the die diameter define the polymer thruput and, consequently, the thickness of the coating.

Afterwards, the coated strand is cooled down by water in a cooling bath, or by air, and is supported by a single block pully up to the winding machine.

EXAMPLE I

The cooling system using a water bath secured a good unwinding of the coated fibers. However, the room temperature cooling system does not sufficiently reduce the temperature of the coated fibers at the winding machine, even when the distance between the die and the winding machine is increased to about 10 meters.

The coating percentage on the fibers stays relatively too high; the lowest value obtained is 15% with a 2 mm die.

EXAMPLE II

The same materials were trialed with a new coating head device. The two polymer rods have been replaced by one rod. The forming cake strand was better coated on all surfaces. We used a cooling spray instead of a cooling bath to avoid all friction for the coated strand (pully).

Two pulling systems have been used for this trial. One was a winding machine running at 600 m/min, and the other was a chopper running at 1.225 m/min.

The 0.8 mm die diameter still did not give us control of coating percentage. The trial run with the winding machine confirmed the good results obtained with the previous trial. The new cooling system by spray offers many advantages compared to the other systems used previously. The strand not being in contact with any pieces obtains a regular coating without accumulation of coating on the strand.

EXAMPLE III

These trials were the same as the other examples except 0.6 mm die head was employed for the rubber coating. These trials also were performed with a squirrel cage in the way to increase the distance between the coating head and the winding machine to allow a better fiber cooling. If the fiber is cooled well, unwinding is improved. All the trial have been run at a 600 m/min speed. The squirrel cage was about 20 meters from the coating head and 20 meters from the winding machine.

The increase of the distance was very profitable, with all the runs realized during this trial. We didn't encounter any tacky problem. The product also was chopped without unwinding problem with the little lab chopper.

With the help of a 0.6 mm die, we consistently kept the coating percentage under 5%.

I claim:

1. A tough, glass fiber reinforced thermoplastic composite consisting essentially of a thermoplastic matrix and coated glass fibers wherein the coating on the glass fibers contains 2 to 6 weight percent of thermoplastic rubber based on the weight of the matrix wherein the thermoplastic rubber is a 40 to 60 weight percent blend of polyethylene and a block copolymer of ethylene and propylene.

2. A composite according to claim 1 wherein only a part of the glass fiber is coated with the thermoplastic rubber.

3. A composite according to claim 1 wherein the weight percent of thermoplastic rubber ranges from 2 to 4 percent.

4. A composite according to claim 1 wherein the amount of glass fibers ranges from 5 to 50 weight percent based on the weight of thermoplastic composite.

5. A composite according to claim 1 wherein the amount of thermoplastic rubber on the fibers ranges from 4 to 40 weight percent based on the weight of the glass fibers.

6. A composite according to claim 1 wherein thermoplastic rubber has a tensile modulus at least 10 times smaller than the tensile modulus of the thermoplastic matrix.

7. A composite according to claim 1 wherein the thermoplastic rubber blend is a maleic anhydride grafted blend.

8. A composite according to claim 1 wherein the thermoplastic rubber blend is an unsaturated silane grafted blend.

9. A composite according to claim 1 wherein the thermoplastic rubber blend is simultaneously grafted with maleic anhydride and an unsaturated silane.

10. A composite according to claim 1 wherein the thermoplastic rubber is a blend with up to 50 weight percent other thermoplastics.

11. A composite according to claim 1 wherein the thermoplastic matrix is a polyamide.

12. A composite according to claim 1 wherein the glass fibers have a chopped length of 75 mm.

13. A composite according to claim 1 wherein the fibers range in length from 0.13 to 0.25 mm.

* * * * *